(No Model.) 3 Sheets—Sheet 1.
D. H. NICHOLS & C. L. & C. A. COTTON.
SYSTEM OF LIGHTING RAILWAY CARS AND PLATFORMS.
No. 485,647. Patented Nov. 8, 1892.
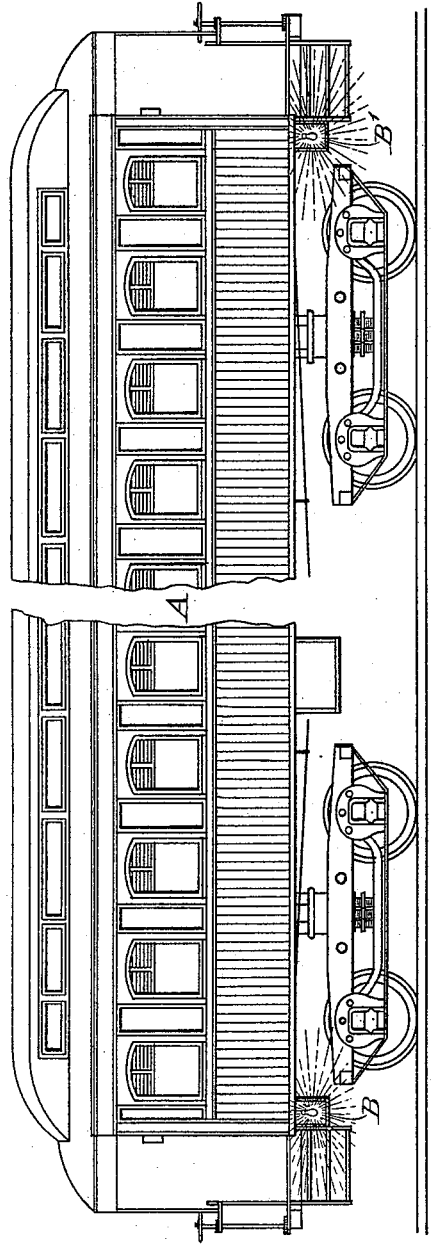
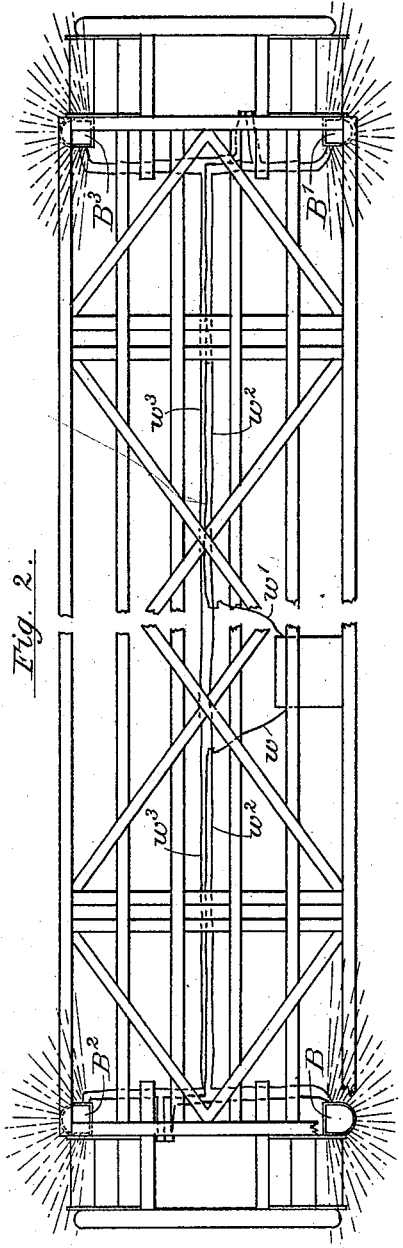
Witnesses.
Saml. G. Stephens.
John R. Snow.
Inventors.
Danton H. Nichols
Charles Leonard Cotton
Charles Albert Cotton
by their attorneys,
Maynadier & Beach.

(No Model.)  3 Sheets—Sheet 2.
D. H. NICHOLS & C. L. & C. A. COTTON.
SYSTEM OF LIGHTING RAILWAY CARS AND PLATFORMS.
No. 485,647. Patented Nov. 8, 1892.
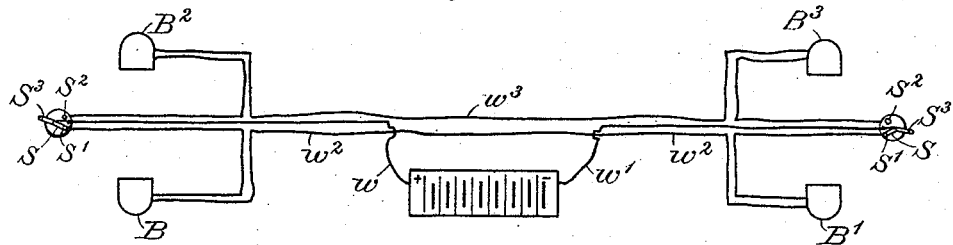
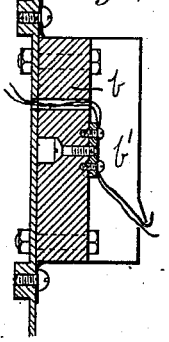
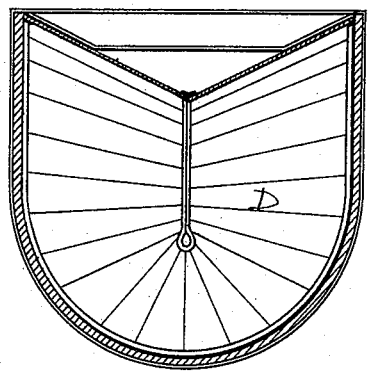
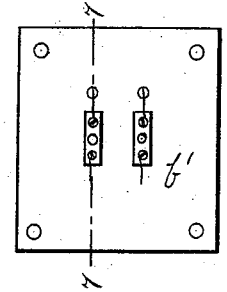
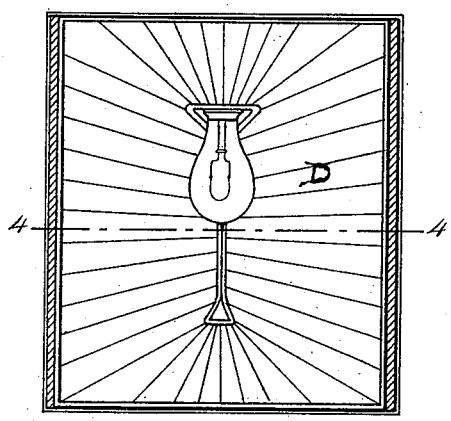
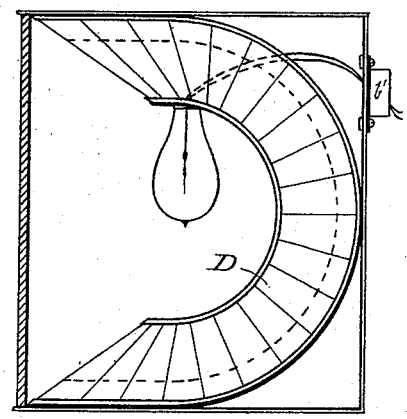

(No Model.) 3 Sheets—Sheet 3.
D. H. NICHOLS & C. L. & C. A. COTTON.
SYSTEM OF LIGHTING RAILWAY CARS AND PLATFORMS.
No. 485,647. Patented Nov. 8, 1892.
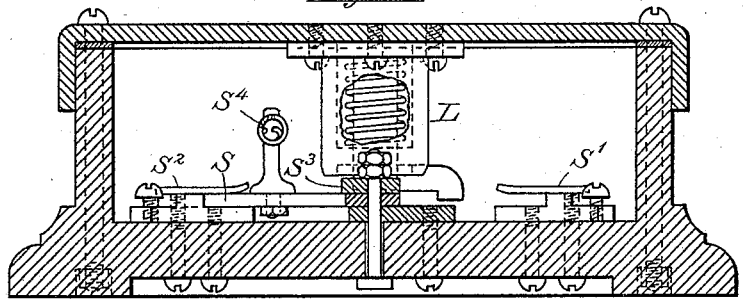
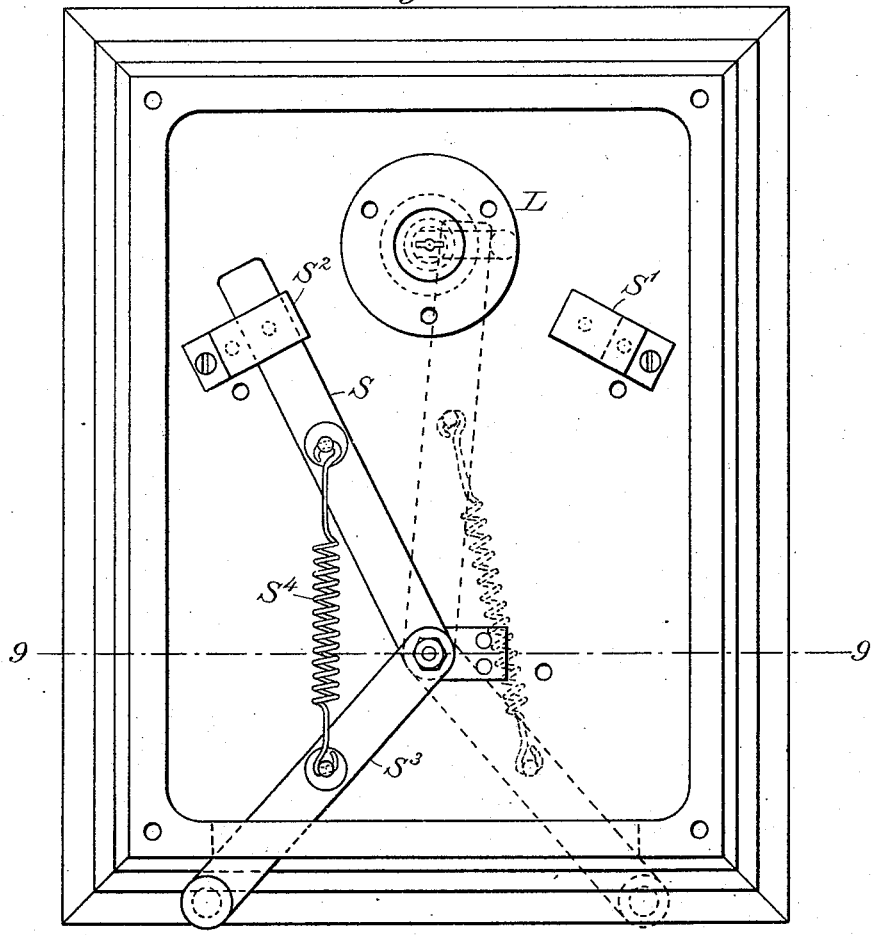

UNITED STATES PATENT OFFICE.

DANTON H. NICHOLS, OF BOSTON, AND CHARLES LEONARD COTTON AND CHARLES ALBERT COTTON, OF DEDHAM, MASSACHUSETTS.

SYSTEM OF LIGHTING RAILWAY CARS AND PLATFORMS.

SPECIFICATION forming part of Letters Patent No. 485,647, dated November 8, 1892.

Application filed September 7, 1891. Serial No. 404,979. (No model.)

*To all whom it may concern:*

Be it known that we, DANTON H. NICHOLS, of Boston, in the county of Suffolk and State of Massachusetts, and CHARLES LEONARD COTTON and CHARLES ALBERT COTTON, both of Dedham, in the county of Norfolk and said State, have invented a new and useful System of Lighting Railways Cars and Platforms, of which the following is a specification, reference being had to the accompanying drawings, in which—

Figure 1 is a side elevation of a car lighted by our new system; Fig. 2, a plan; Fig. 3, a diagram illustrating the electrical connections. Figs. 4 to 8, inclusive, illustrate the lantern, Fig. 4 being a section on line 4 4 of Fig. 5; Fig. 5, a front view with the curved glass plate forming the sides and front in section; and Fig. 6, a side elevation of the glass plate, being in section. Fig. 7 is a detail in section, enlarged; and Fig. 8, a plan showing the mode of wiring the lantern. Figs. 9 and 10 illustrate a switch, Fig. 9 being a section on line 9 9 of Fig. 10, and Fig. 10 a plan with the cover removed.

Our invention relates to a system of car-lighting by means of electric lamps at opposite ends, but on the same side of a car, in a circuit with switches near each end of the car and with reflectors to distribute the light along the steps and side of the car and outwardly and downwardly. When the car is to run either end first, four lamps are necessary, one at each corner of the car, and these lamps must be lighted in pairs, so that there are electrically two pairs and two circuits, the lamps of each pair in series in a single circuit. These two pairs are at opposite sides of the car, and one man must attend to two cars. Consequently he must control the lamps on one side of the car while going one way and the lamps on the other side while going the other way; and, moreover, he must always be at his post, which is for one brakeman the rear of the first car in the train or the front of the second car, for each brakeman has two cars, one the first and second, another the third and fourth, and so on. When starting on a trip, the first brakeman will set the front switch on the front car to cut out the left-hand circuit, where the exit is on the right, and he will set the rear switch of the second car to cut out the left-hand circuit, so that by passing from the front of the second car to the rear of the first, or vice versa, he can operate both switches necessary to light the right-hand lamps of both cars. When starting on a return trip with the cars traveling the other end to, he turns the seats and sets the switches reversely, so that he still has both pairs of lamps under control by simply passing from the rear of one car to the front of the other, or vice versa.

In the drawings, A represents a railway-car of usual construction, B B' B² B³ lamps, and D a reflector. The lamp and its reflector are held in a suitable case adapted to be secured under one corner of the car-body, and the reflector is so shaped that the light from the lamp is thrown outward and to both sides and also downwardly, lighting up the steps of the car and the side of the car and truck, and also the platform when the car is stopped at a station.

The preferred form of lantern is an incandescent light, a reflector, which is a ridge of reflecting material—as copper silver-plated on one side—whose apex forms a curve, as best shown in Fig. 6, and a casing best made of stout sheet metal on the top, bottom, and back, and a curved plate of tough glass for the sides and front.

The block $b$, of non-conducting material, fast to the back of the lantern and covered with the sheet-metal cover $b'$, (shown in Figs. 7 and 8,) is a convenient device for connecting the lantern-wires with the car-wires.

The details of construction of the lantern may be widely varied and will be well understood by all skilled in this art without further description, the main point being that the reflector shall distribute the light from the lamp along the steps and side of the car and on the platform of the station.

In the drawings we have shown four lanterns, one at each corner of the car; but usually only two are in use at the same time, for the passengers usually enter and leave a car on one side only. In order to switch in the two lights B B' at the front and rear, the wires $w$ $w'$, forming the poles of the battery or other source of electric energy, extend each to the arm S of a switch, that arm being adapted to engage with either one of two contacts S' S². The wire $w^2$ extends from contacts S' through lamps B B', and the wire $w^3$ extends through lamps B² B³ from contacts S². Consequently when arm S of one switch is on contact S' of that switch the circuit will be completed through lamps B B' when arm S of the other switch is on contact S' of that switch. To light lamps B² B³, the arm S of both switches must be on its contact S². In the switch shown the arm S is moved from contact S' to contact S² by the lever S³ and spring S⁴, as will be clear without further description.

In practice a lock is desirable, which when locked will prevent the arm S from moving onto one of the contacts, and such a lock is indicated at L, Figs. 9 and 10. The details of construction of this lock may be widely varied, as will be clear. It simply serves to prevent the arm S reaching contact S' in Figs. 9 and 10; but in the other switch of the pair the lock when locked will prevent arm S from reaching contact S², so that when both switches are locked none of the lamps can be lighted.

In operation the trainman just before he calls a station will throw one of the switches to light the lamps B B' or B² B³ on that side of the car which will be near the platform when the train is stopped, so that when the train stops the steps on that side and the platform will be properly lighted up. After the train is running again the trainman can throw one of the switches to extinguish the lamps.

What we claim as our invention is—

The system of lighting railway-cars by two electric lamps at opposite ends but on the same side of a car, a circuit for the lamps, two switches in the circuit, one near one end and the other near the other end of the car, and reflectors, one for each lamp, each constructed and arranged to distribute the light along the steps and side of the car and outwardly and downwardly, all substantially as described.

DANTON H. NICHOLS.
CHAS. LEONARD COTTON.
CHARLES ALBERT COTTON.

Witnesses:
JAMES W. PERKINS,
J. E. BARBER.